Patented June 1, 1943

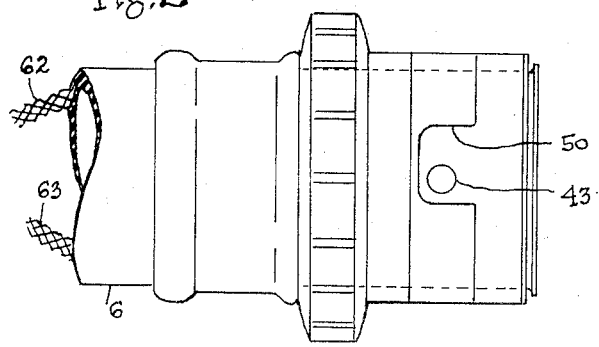
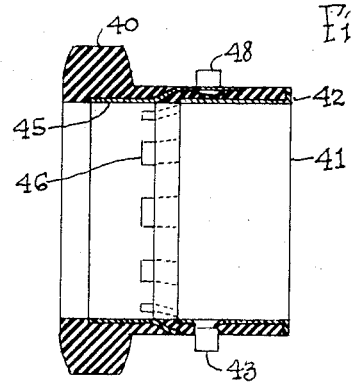
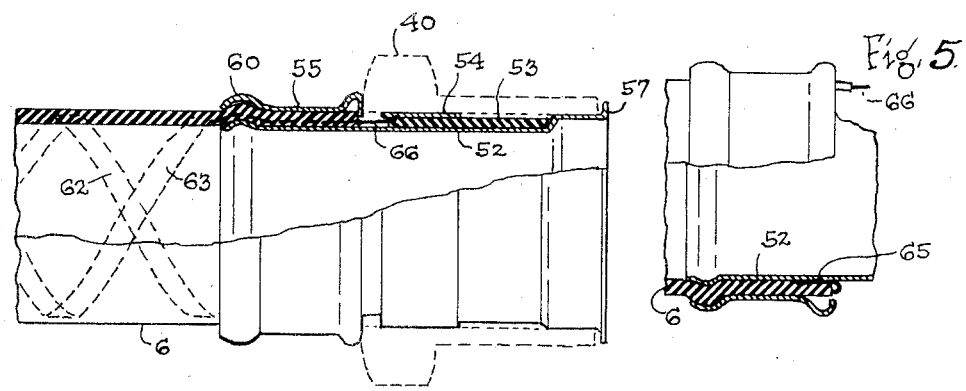
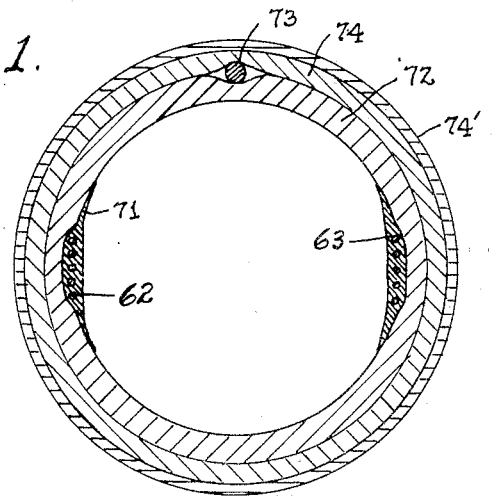

2,320,367

UNITED STATES PATENT OFFICE 2,320,367

FLEXIBLE HOSE AND METHOD OF FORMING THE SAME

Ward Leathers, Haworth, N. J., assignor to Quadrex Corporation, New York, N. Y., a corporation of Delaware Application June 27, 1938, Serial No. 216,011

5 Claims. (Cl. 174—47)

The present invention relates to a flexible hose and to a method of making the same. More particularly, the invention relates to a flexible conductive suction hose designed for use in connection with canister-type vacuum-cleaner machines of the type having a filtering element enclosed in a casing, together with a motor-driven-air-impeller and wherein all cleaning is done through the suction hose.

The hose, because of its conductive features, makes light available at the end of hose and extension tube without any effort or inconvenience on the part of the user because; it provides means whereby the hose is swivelled to the body of the machine; it permits instant removal of the hose from the machine; it provides removability of the extension tube from the hose in practically the same manner as in common practice; and the electrification is completely enclosed, safely insulated, fully flexible, and requires no attention whatever on the part of the operator.

In order to set forth my invention so that all those familiar with these subjects may understand, I have prepared the following specification to which drawing is appended, of which:

Fig. 1 is a sectional view taken transversely through the medial region of a vacuum-cleaner hose constructed in accordance with the principles of the present invention.

Fig. 2 is a side elevational view of the inner end of the hose showing the swivel sleeve coupling therefor.

Fig. 3 is a longitudinal sectional view taken through the sleeve coupling.

Fig. 4 is a fragmentary side elevational view, partly in section, of the inner end of the hose and coupling therefor, and Fig. 5 is a fragmentary side elevational view of a portion of the hose and coupling therefor.

Most canister-type machines, whether built with horizontal or vertical axis, must be separable or openable for the removal of the dirt. Such opening or separation occurs between the motor-driven-air-impelling-unit and the hose attachment portion of the machine. Hence electrical connections must be established between the separable portions of the machine in order that circuits may be provided for both running the motor and lighting the lamp. It is highly desirable that the establishment of this circuit between the separable portions of the machine should be made with no additional operation than that of joining the portions in such manner as is already necessary for making a substantially air-tight connection.

Referring now to the drawing, the flexible hose 6 comprising the present invention is adapted to be joined to the hose-socket of a vacuum-cleaner in a swivelled manner by means of a sleeve-coupling 40 (see Figs. 3 and 4). This coupling comprises a tubular metal part 41 with a protecting flange 42 on its inner end and an electrical conducting bayonet pin 43 rigidly joined thereto. It further comprises another metallic tubular part 45 having perforations 46 therein for permitting the moulded plastic insulating material to flow and bind therethrough. It also is provided with an electrical conducting bayonet pin 48 rigidly joined thereto. The tubular parts 41 and 45 telescope at the points adjacent the pins 43 and 48 but do not contact. By means of a slot 50 in the tubular part 45, the pin 43 joined to the inner tubular part 41 may extend outward without making contact with the part 45. These tubular parts are set on the core of a pressure mould and the plastic insulation material is formed therearound and therethrough, in the manner shown, by the compression or injection process.

This coupling is cylindrical and smooth both outside and inside. The inboard end of the flexible hose is provided with an inner metallic sleeve 52 which is surrounded by an insulating hard fibre sleeve 53 over which is pressed a metallic sleeve or ring 54. A further outer tubular sleeve 55 is used for anchorage purposes as well as back-stop for the coupling 40. A turned flange 57 on the inner sleeve 52 also serves as a stop for the coupling 40. In assembly the tubular parts 53 and 54 are tightly pressed on the part 52. The end of the flexible hose 6 is then disposed between the inner and outer sleeves 52 and 55 and by means of the roller crimping as at 60 all the parts mentioned are joined firmly and inseparably together. The flexible hose has within itself two electrical conductors 62 and 63 devised and provided in a manner hereinafter described, the ends of which protrude from the end of the hose. In making the foregoing assembly one of these conductors is turned back into the end of the hose so that it makes electrical contact with the tube 52, as at 65 in Fig. 5. The other conductor is carried in an insulated manner to a point where it is soldered to the under side of the metal ring 54, as at 66. The coupling 40 is then placed over the assembled hose end and the flange 57 turned on the tube 52. The hose end is then free to rotate within the coupling 40 in a swivel manner.

The flexible hose is made in a manner substantially as follows: Lightly insulated flexible braided copper conductors 62 and 63, Fig. 1, are each joined to a strip of calendered fabric 71. Two of these are applied, at a suitable spiral, to the mandrel upon which the hose is made. Next applied to the mandrel in the following order is a layer of calendered fabric 72, a spirally wound music-wire 73, and another layer of calendered fabric 74. After vulcanizing a braid 74' is applied. At the time of vulcanizing the ends of the braided conductors are brought out of the hose at both ends for attachment and electrical connection, as previously described.

Having set forth my invention so that all those familiar with these arts may comprehend its function, construction, and significance, I wish it understood that many variations in the design of parts and their relationship as shown in this specification may be varied by those skilled in such design without departing from the spirit of my invention.

I claim:

1. A method of manufacture for an electrified vacuum-cleaner hose, comprising the winding of a flexible electrical conductor with a minimum of insulating material thereon in an extended helix on a mandril, then applying a layer of impregnated fabric over said conductor covering the entire mandril, then winding entire surface with a helix of music wire, then covering music-wire completely with impregnated fabric, then vulcanizing on mandril, and removing hose from mandril.

2. A method of manufacture for an electrified vacuum-cleaner hose, comprising the winding of a flat, braided, flexible electrical conductor with a minimum of insulating material thereon on a mandril, then applying a layer of impregnated fabric over said conductors covering entire mandril, then winding entire surface with a helix of music-wire, then covering music-wire completely with impregnated fabric, then vulcanizing on mandril, and removing hose from mandril.

3. A method of manufacture for an electrified vacuum-cleaner hose, comprising the winding of a flat, brailed, flexible electrical conductor with a minimum of insulating material thereon in an extended helix on a mandril, then applying a layer of impregnated fabric over said conductors covering entire mandril, then winding entire surface with a helix of music wire, then covering music-wire completely with impregnated fabric, then vulcanizing on mandril, removing mandril, and covering with braid.

4. In a vacuum-cleaner hose, a flexible electrical conductor disposed helically and having a layer of insulation on the inside of the helix, adjacent turns of said flexible conductor being relatively widely separated from each other, a layer of impregnated fabric covering said conductor, a music-wire winding over said fabric, another impregnated fabric over said music-wire, all vulcanized together and covered with a protective braid.

5. In a vacuum-cleaner hose, a flexible, flat-braided wire electrical conductor disposed helically having a layer of insulation on the inside of the helix, a layer of impregnated fabric covering said conductor, a music-wire winding over said fabric, another impregnated fabric over said music-wire, all vulcanized together and covered with a protective braid.

WARD LEATHERS.